(12) United States Patent
Mackin et al.

(10) Patent No.: US 9,469,342 B2
(45) Date of Patent: Oct. 18, 2016

(54) AXLE AND TRANSMISSION ARRANGEMENT FOR AN AGRICULTURAL VEHICLE

(71) Applicant: DEERE & COMPANY, Moline, IL (US)

(72) Inventors: Ryan P. Mackin, Milan, IL (US); Daniel J. Burke, Cordova, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 14/473,820

(22) Filed: Aug. 29, 2014

(65) Prior Publication Data
US 2016/0059887 A1    Mar. 3, 2016

(51) Int. Cl.
| | | |
|---|---|---|
| *B62D 7/06* | (2006.01) | |
| *A01F 12/44* | (2006.01) | |
| *B60B 35/16* | (2006.01) | |
| *B60K 17/06* | (2006.01) | |
| *B60K 17/16* | (2006.01) | |
| *B62D 55/08* | (2006.01) | |

(52) U.S. Cl.
CPC .............. *B62D 7/06* (2013.01); *A01F 12/444* (2013.01); *B60B 35/163* (2013.01); *B60K 17/06* (2013.01); *B60K 17/165* (2013.01); *B62D 55/08* (2013.01); *B60B 2900/351* (2013.01)

(58) Field of Classification Search
CPC ...... B60K 5/00; B60K 17/00; B60K 17/165; B60K 17/06; B60K 17/043; B62D 7/06; B62D 55/08; B60B 35/163; B60B 2900/351; A01F 12/444
See application file for complete search history.

(56) References Cited

U.S. PATENT DOCUMENTS

| | | | | |
|---|---|---|---|---|
| 1,556,180 | A | * | 10/1925 | Tomlinson et al. ............. 74/390 |
| 2,173,605 | A |   | 9/1939 | Edwards, Jr. |
| 2,496,022 | A |   | 1/1950 | Remonte |
| 2,536,148 | A | * | 1/1951 | Andrews ....................... 280/785 |
| 2,543,319 | A | * | 2/1951 | Heitshu ......................... 180/344 |
| 3,409,098 | A | * | 11/1968 | Brueder ....................... 180/54.1 |
| 3,645,350 | A | * | 2/1972 | Deli et al. ..................... 180/9.1 |
| 4,055,262 | A | * | 10/1977 | Bauer et al. .................. 414/697 |
| 4,154,471 | A | * | 5/1979 | Long ............................. 296/204 |
| 4,219,208 | A |   | 8/1980 | Fuller et al. |
| 4,514,007 | A | * | 4/1985 | Macht .......................... 180/311 |
| 4,671,370 | A | * | 6/1987 | Krude .......................... 180/348 |
| 4,677,866 | A | * | 7/1987 | Tone ........................... 74/15.86 |
| 4,746,145 | A | * | 5/1988 | Furuichi et al. .............. 280/786 |
| 4,799,571 | A | * | 1/1989 | Bopp ........................... 180/294 |
| 4,955,455 | A | * | 9/1990 | Albright et al. ............. 180/291 |

(Continued)

FOREIGN PATENT DOCUMENTS

EP    1932421 B1    2/2010

OTHER PUBLICATIONS

European Patent Office, Extended European Search Report in Application No. 15178259.6 received Feb. 2, 2016.

*Primary Examiner* — Drew Brown
*Assistant Examiner* — Timothy Wilhelm
(74) *Attorney, Agent, or Firm* — Lorenz & Kopf, LLP

(57) ABSTRACT

An integrated axle and transmission arrangement may include an axle arrangement for an agricultural vehicle with ground-engaging wheels or tracks. A support structure of the axle arrangement may define an internal mounting volume configured for mounting a transmission assembly therein. First and second stub axles may extend from opposite sides of the support structure along an axle axis. The mounting volume may be disposed along the axle axis.

20 Claims, 7 Drawing Sheets

(56) References Cited

U.S. PATENT DOCUMENTS

| | | | |
|---|---|---|---|
| 5,092,554 A * | 3/1992 | Gibbs | 248/339 |
| 5,188,195 A * | 2/1993 | Haustein | 180/353 |
| 5,964,567 A * | 10/1999 | Bamford | 414/685 |
| 6,293,364 B1 * | 9/2001 | Anderson et al. | 180/312 |
| 6,470,991 B1 * | 10/2002 | Bowman et al. | 180/312 |
| 6,786,295 B2 * | 9/2004 | Herrmann et al. | 180/312 |
| 6,871,875 B2 * | 3/2005 | Grimm et al. | 280/785 |
| 7,658,262 B2 * | 2/2010 | Bowers | 180/344 |
| 7,670,219 B2 * | 3/2010 | Matousek | B60B 35/163 460/100 |
| 7,775,556 B2 * | 8/2010 | Sakamoto et al. | 280/781 |
| 7,866,700 B2 * | 1/2011 | Weibling et al. | 280/781 |
| 8,016,065 B2 * | 9/2011 | Osborn et al. | 180/233 |
| 8,056,911 B2 * | 11/2011 | Husson | 280/93.502 |
| 8,186,474 B2 * | 5/2012 | Shioji et al. | 180/312 |
| 8,511,711 B2 * | 8/2013 | Honzek | 280/785 |
| 9,038,755 B2 * | 5/2015 | Sedoni et al. | 180/65.31 |
| 2003/0085591 A1 * | 5/2003 | Seksaria et al. | 296/194 |
| 2005/0167969 A1 * | 8/2005 | Fukazawa et al. | 280/785 |
| 2008/0060867 A1 * | 3/2008 | Oda et al. | 180/291 |
| 2013/0333959 A1 * | 12/2013 | Wagemann et al. | 180/62 |
| 2014/0174839 A1 * | 6/2014 | Steben et al. | 180/9.23 |
| 2015/0060171 A1 * | 3/2015 | Tani et al. | 180/69.4 |

* cited by examiner

AXLE AND TRANSMISSION ARRANGEMENT FOR AN AGRICULTURAL VEHICLE

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates to a support arrangement for agricultural vehicles, and in particular to an integrated structure for an axle and a transmission.

BACKGROUND OF THE DISCLOSURE

Agricultural vehicles come in various forms for cutting and processing crop material. Combine harvesters (or "combines"), for example, are agricultural vehicles that may be configured to reap, thresh, and winnow various crops. Combines typically gather crop materials from the field with a header mounted to a feederhouse at the forward end of the combine. Various internal mechanisms may then separate and clean various portions of the gathered crop material. A particular combine may be able to gather and process different types of crops depending on the configuration of the particular header that is mounted to the combine. For example, a grain header can be attached for harvesting wheat and a corn header can be attached for harvesting corn.

Certain agricultural vehicles, including various combines, may include a cleaning system for separating chaff and trash from other portions of gathered material. In typical combines, for example, a cleaning system may include a separator, a cleaning shoe, and a cleaning fan. Crop material gathered by the combine may be directed through the separator to the cleaning shoe, where an air flow from a cleaning fan separates lighter chaff from heavier materials (e.g., grain). In typical designs, the cleaning shoe may include a chaffer and a sieve, through which crop material may be sifted. Heavier crop materials (e.g., grain) may fall through openings on the chaffer and the sieve (e.g., through transverse louvers) for transport to a grain tank, as air flow from the cleaning fan may blow lighter material (e.g., chaff) upwards and backwards towards the rear of the combine.

In order to achieve desired performance in cleaning (or other) operations, it may be useful to utilize relatively large cleaning shoes (or other devices). However, the size of a particular vehicle may limit the amount of space within which these devices may be disposed. Accordingly, it may be useful to arrange various devices and components within a combine (or other vehicle) such that available space is utilized with appropriate efficiency.

SUMMARY OF THE DISCLOSURE

An integrated axle and transmission arrangement for an agricultural vehicle is disclosed.

According to one aspect of the disclosure, the integrated axle and transmission arrangement may include an axle arrangement for an agricultural vehicle with ground-engaging wheels or tracks. A support structure may define an internal mounting volume configured for mounting a transmission assembly therein. First and second stub axles may extend from opposite sides of the support structure along an axle axis. The mounting volume may be disposed along the axle axis.

In certain embodiments, the support structure may include longitudinal support members that are spaced apart along, and intersect, the axle axis. The axle axis may be coaxial with a drive axis of the ground-engaging wheels or tracks. The support structure may further include lateral support members that span the longitudinal support members. The lateral and longitudinal support members may be separate members, with each lateral support member connecting to the longitudinal support members. The lateral support members may include metal plates, and the longitudinal support members may include angled structural members.

In certain embodiments, each stub axle may include at least one metal plate extending between the support structure and a plate for attaching the relevant wheel to the stub axle. Each stub axle may be a weldment of multiple metal plates fixed with respect to the support structure. Drive plates may be included at free ends of the stub axles, and a structural tie member may extend between the drive plates.

These and other features and advantages of the present disclosure will become clear to a person skilled in the art after reading the following detailed description and in consideration of the drawings.

BRIEF DESCRIPTION OF THE DRAWINGS

Like reference numerals in the drawings indicate like components, parts, or operations.

DETAILED DESCRIPTION

Figure 1:
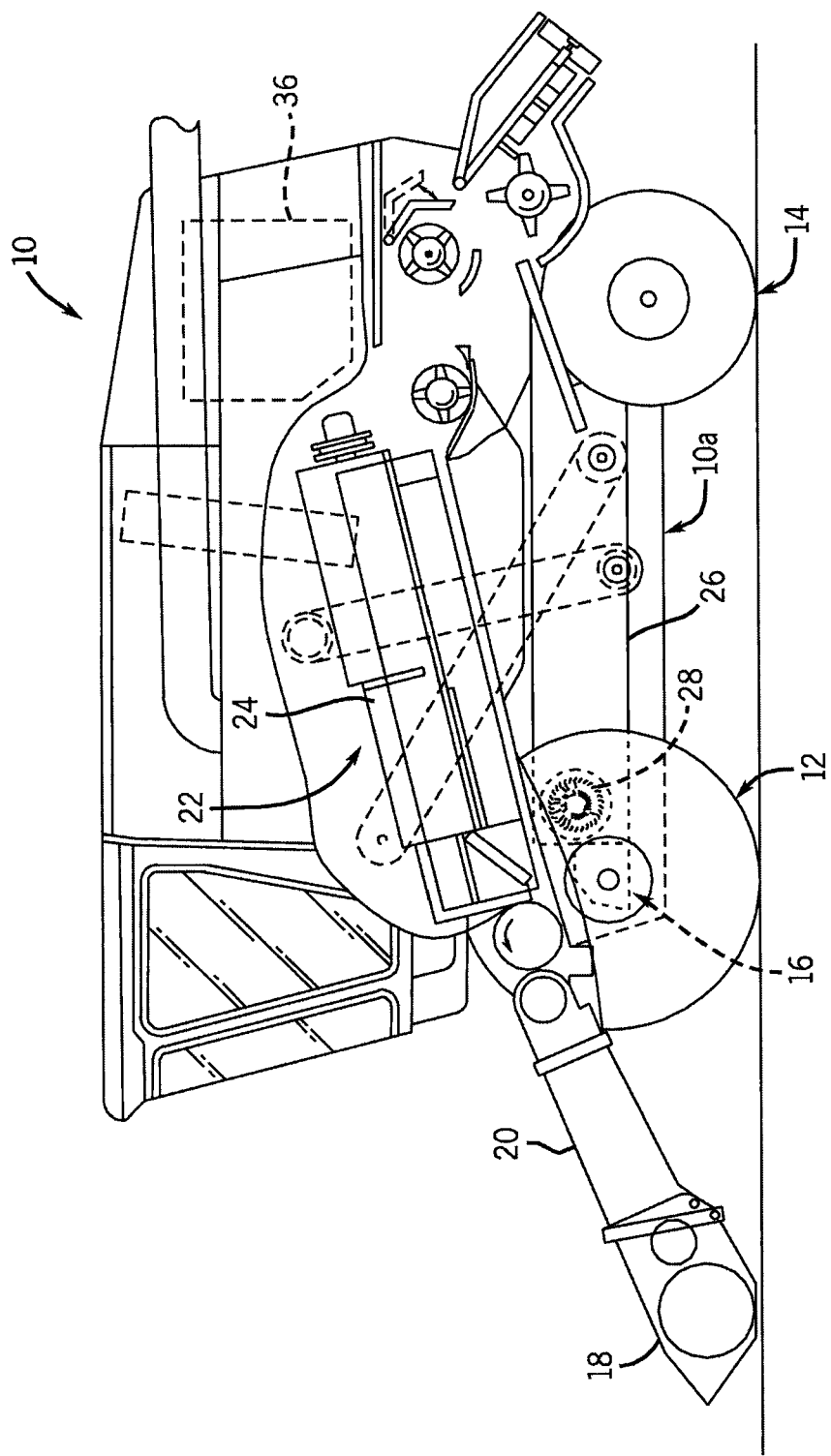
FIG. 1 is a side view of an example agricultural vehicle in the form of an agricultural combine harvester.

The following describes one or more example embodiments of the disclosed support arrangements for an agricultural vehicle, as shown in the accompanying figures of the drawings described briefly above. Various modifications to the example embodiments may be contemplated by one of skill in the art.

"Forward," and "rearward" references (and, generally, references to the "longitudinal" direction) are used herein as a matter of convenience and are generally determined based upon the normal direction of travel for a relevant vehicle. Similarly, references to the "lateral" direction generally refer to directions transverse to the longitudinal direction, with the "left" and "right" directions being determined based from a perspective facing the forward direction for a vehicle. "Upward" and "downward." or "vertical" directions are relative to the ground.

As noted above, it may be useful to arrange internal components and devices of a vehicle (e.g., an agricultural combine) such that available space is efficiently utilized. In certain embodiments, a useful support arrangement for a vehicle may include an axle assembly with an integrated transmission. In certain embodiments, such an integrated axle and transmission arrangement may allow the transmission to be disposed in relatively close proximity to the axle assembly without excessive use of space. This may, for example, allow relatively efficient and direct routing of power from the transmission to the relevant wheels (e.g., via one or more drive shafts extending from the transmission toward the wheels).

An axle assembly for an integrated axle and transmission arrangement may include an axle support structure configured as an arrangement of support plates within the body of the vehicle. The various support plates may be welded together, or otherwise attached, such that the plates define (at least in part) an internal volume. Stub shafts (e.g., weldments of various plates) may be attached at either lateral side of the support structure, and wheels (or tracks, and so on) of the vehicle may be attached to the stub shafts. Both of the stub shafts and at least part of the internal volume defined by the axle support structure may be generally oriented along a common axis of rotation of the wheels (i.e., along the axle axis).

In order to controllably drive the wheels mounted to the stub shafts, a transmission assembly may be mounted within the mounting volume. For example, a transmission assembly including a multi-stage (or other) transmission may be mounted to a front plate of the axle support structure, such that the multi-stage (or other) transmission extends rearward into the internal volume of the axle support structure. In such a configuration, an output shaft may extend from either lateral side of the transmission assembly in order to provide rotational power to the wheels.

In certain embodiments, the wheels may be attached to the stub axles via a wheel plate, which may extend from the axle axis to below side plates of the axle support structure. A tension rod (or other tie member) may be attached to the two side plates, and extend between the two side plates, such that the tension rod (or other tie member) may provide structural support to the axle assembly as the wheels support the weight of the vehicle.

In certain embodiments, an additional (or alternative) useful support arrangement for a vehicle (e.g., an agricultural combine) may include an integrated fan and axle arrangement. For example, a cleaning shoe (or other cleaning device) of a vehicle may be configured to separate various portions of crop material using (at least in part) an air flow generated by a fan. The fan may include an impeller and a scroll for generating the air flow for the cleaning shoe (or other device). A front axle assembly of a combine (or other vehicle) may include various support plates (or other members) that are welded (or otherwise attached) into a suitable support structure for the axle (e.g., a central axle support structure and laterally extending stub axles). In order to increase the available space for the cleaning shoe (or other device), a portion of the scroll of the fan may be configured as a portion of the axle assembly (or, conversely, a portion of the axle assembly may be configured as a portion of the scroll). In this way, the scroll may serve its function with regard to the air flow from the fan, while also providing structural rigidity to the axle assembly (or, conversely, a support plate of the axle assembly may provide structural rigidity to the axle assembly while also forming a portion of the fan scroll).

Referring now to FIG. 1, one or more of the disclosed support arrangements may be utilized with respect to an example agricultural vehicle 10 with a chassis 10*a*. As depicted, the vehicle 10 is in the form of an agricultural combine. It will be understood, however, that the support arrangements disclosed herein may also be utilized with other agricultural vehicles 10, including other combines, which may be configured differently than the vehicle 10. Thus, aspects of this disclosure are not limited to the configuration of the example vehicle 10.

The vehicle 10 may include front and rear ground-engaging elements for supporting the vehicle 10 with respect to the ground. As depicted in FIG. 1, for example, the vehicle 10 is supported by a pair of front wheels 12 (left and right), and a pair of rear wheels 14 (left and right). (Right side wheels 12 and 14 are hidden from view in FIG. 1.) The front wheels 12 may be attached to a front axle assembly 16, and the rear wheels 14 may be attached to a rear axle assembly (not shown). Power from an engine 36 may be transmitted to the wheels 12 via various intermediary systems (e.g., various transmissions, motors, generators, pumps, and so on). In certain embodiments, tracks or other ground-engaging elements may be used instead of wheels 12 or 14.

A header 18 may gather crop material from a field, while a feederhouse 20 to which the header 18 is attached may direct the gathered crop towards a crop processing unit 22 within the vehicle 10. The crop processing unit 22 may include, for example, a separator 24, a cleaning shoe 26, a cleaning fan 28, and various other devices, for separating grain (or other saleable or useful products) from chaff and other trash.

Referring also to FIGS. 2-5, an improved arrangement of an axle assembly 16*a*, a cleaning shoe 26*a*, and a fan 28*a* are depicted. It will be understood that various aspects of this improved arrangement, as discussed in greater detail below, may be implemented individually or collectively, in different embodiments.

As depicted, the axle assembly 16*a* includes a centrally disposed axle support structure 40, and a pair of stub axles 32 and 34 for mounting the front wheels 12 to the agricultural vehicle 10. The stub axles 32 and 34, in combination with the axle support structure 40 may be configured to provide a suitably rigid structure for support of the weight of the vehicle 10 at the wheels 12. As depicted, the axle support structure 40 is centrally disposed, and relatively symmetric with regard to a centerline of the vehicle 10. In other embodiments, a similar support structure (not shown) may be offset from the centerline of the vehicle 10, may be non-symmetrical in various ways, or may otherwise differ from the depicted axle support structure 40.

In certain embodiments, as also discussed in greater detail below, the axle support structure 40 may provide a mounting frame for attachment of a transmission assembly 30, which may be utilized to drive the wheels 12. A transmission assembly for the vehicle 10 may be configured in a variety of ways. The transmission assembly 30, for example, may include a motor (e.g., a hydraulic motor) powered by the engine 36 and a gear box (e.g., a differential gear box or multi-stage transmission) configured to transmit power received at a transmission input to the wheels 12. The motor may accordingly, for example, provide power to drive the wheels 12 via the transmission gear box. In other configurations, the transmission assembly 30 may be configured in various different ways, and may, for example, include various other devices, such as other motors, other gear boxes, various clutch devices, and so on.

The axle support structure 40 may be formed from a number of longitudinally extending side members, which may be connected to each other by a number of laterally extending cross members. As depicted, for example, the axle support structure 40 includes side plates 42 and 44 (or other longitudinal support members), which are laterally spaced from one another so as to partly define a partially enclosed internal volume 46. In certain embodiments, the side plates 42 and 44 also define (or are disposed at) the lateral sides of the body of the vehicle 10. In such embodiments, the stub axles 32 and 34, which are attached to the side plates 42 and 44, may accordingly extend outside of the body of the vehicle 10.

To provide appropriate structural strength to the axle support structure 40, a laterally extending upper support structure 48 may be welded (or otherwise attached) to each of the side plates 42 and 44. Accordingly, the support structure 48 may be viewed as further defining the internal volume 46. As depicted, the support structure 48 is formed as a weldment of various plates (including angled upper plate 48a), which is attached to the side plates 42 and 44 near the upper edges of the side plates 42 and 44. It will be understood, however, that other configurations are possible. For example, an alternative (or additional) support structure to connect the side plates 42 and 44 may be formed as a hollow tube, box, or other weldment, each configured to provide appropriate structural rigidity and strength to the axle support structure 40.

The axle support structure 40 may further include front and rear members (or other support members or structures). For example, in the embodiment depicted, a front plate 50 (or other lateral support member) may be welded (or otherwise attached) to each of the side plates 42 and 44 near the front of the axle support structure 40. In certain embodiments, as discussed in greater detail below, the front plate 50 (or another plate) may be configured as a mounting plate for the transmission assembly 30, as well as a structural member of the axle support structure 40. In such embodiments, the front plate 50 (or another plate) may also be viewed as a "transmission mounting plate." It will be understood, however, that other configurations are possible. For example, an alternative (or additional) member or support structure for connecting the front portions of the side plates 42 and 44 may be formed as a hollow tube, box, or other weldment. Likewise, a member or structure other than the plate 50 may alternatively (or additionally) be utilized as a transmission mounting plate.

The various support members and structures of the axle support structure 40 may generally form a partial shell or shield around the internal volume 46. Such a shell may for example, include front, top and rear walls (e.g., as formed by the front plate 50, upper support structure 48, and so on), with a generally open bottom. In this way, for example, even if the axle support structure 40 is formed as a weldment, it may be relatively straightforward to access the internal volume 46 from the bottom of the axle support structure 40. This may result, for example, in more streamlined maintenance of various components of the vehicle 10, including the transmission assembly 30 when the transmission assembly 30 is mounted within the internal volume 46.

Figure 2:
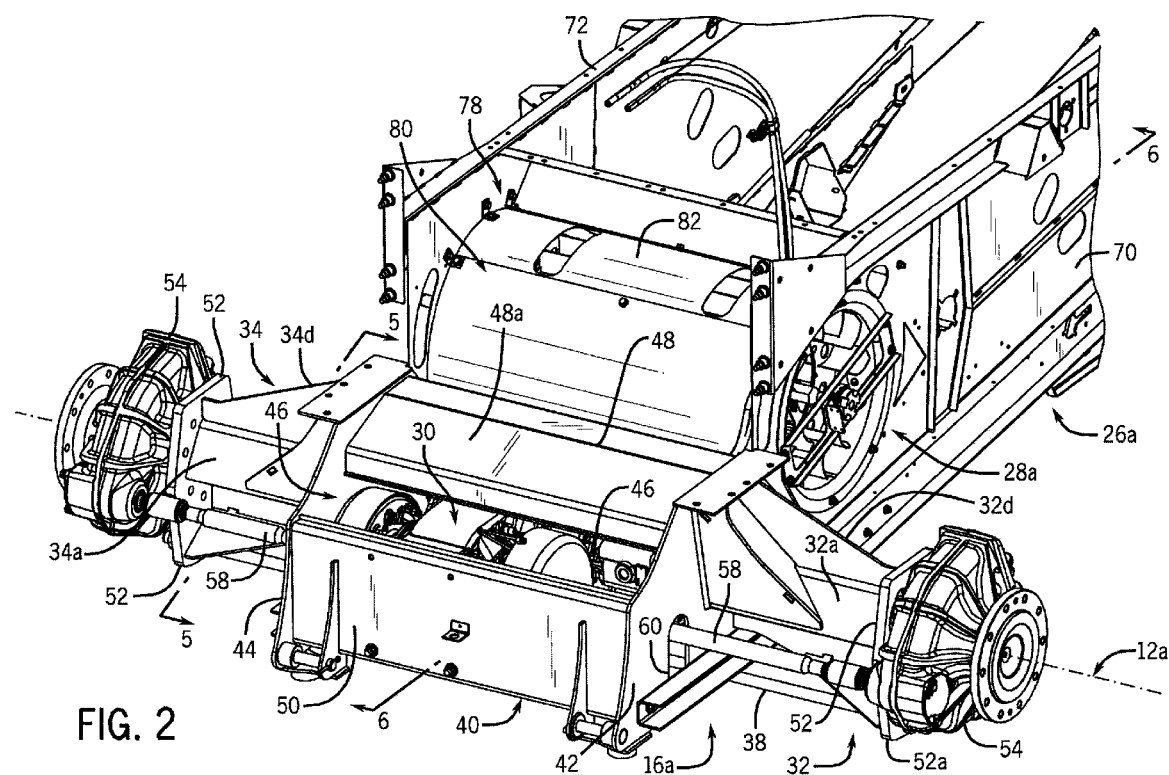
FIG. 2 is a partial perspective view of a support arrangement for the agricultural vehicle of FIG. 1, showing a transmission, fan, cleaning shoe, and other components.
Figure 3:
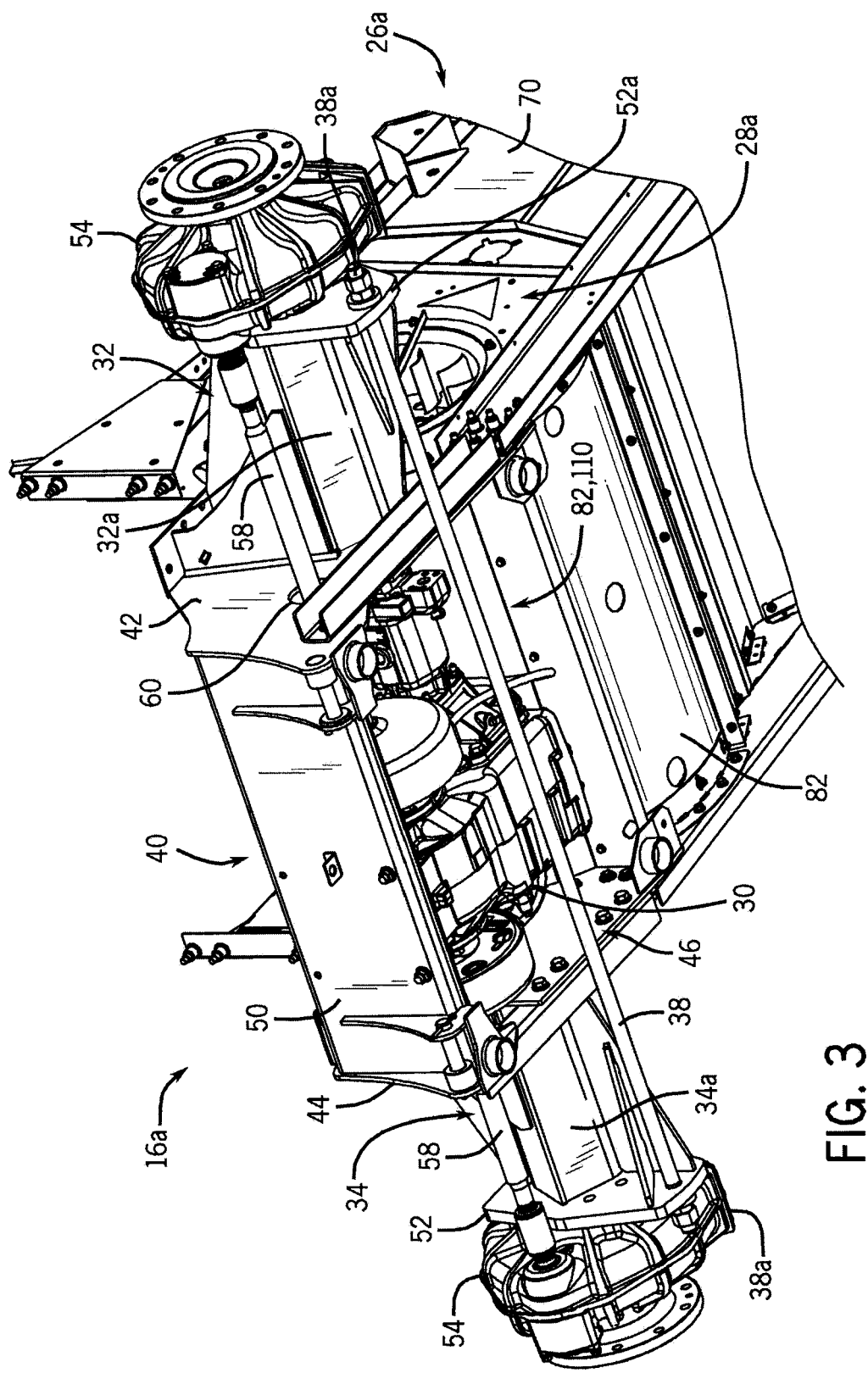
FIG. 3 is another partial perspective view of the support arrangement of FIG. 2.
Figure 4:
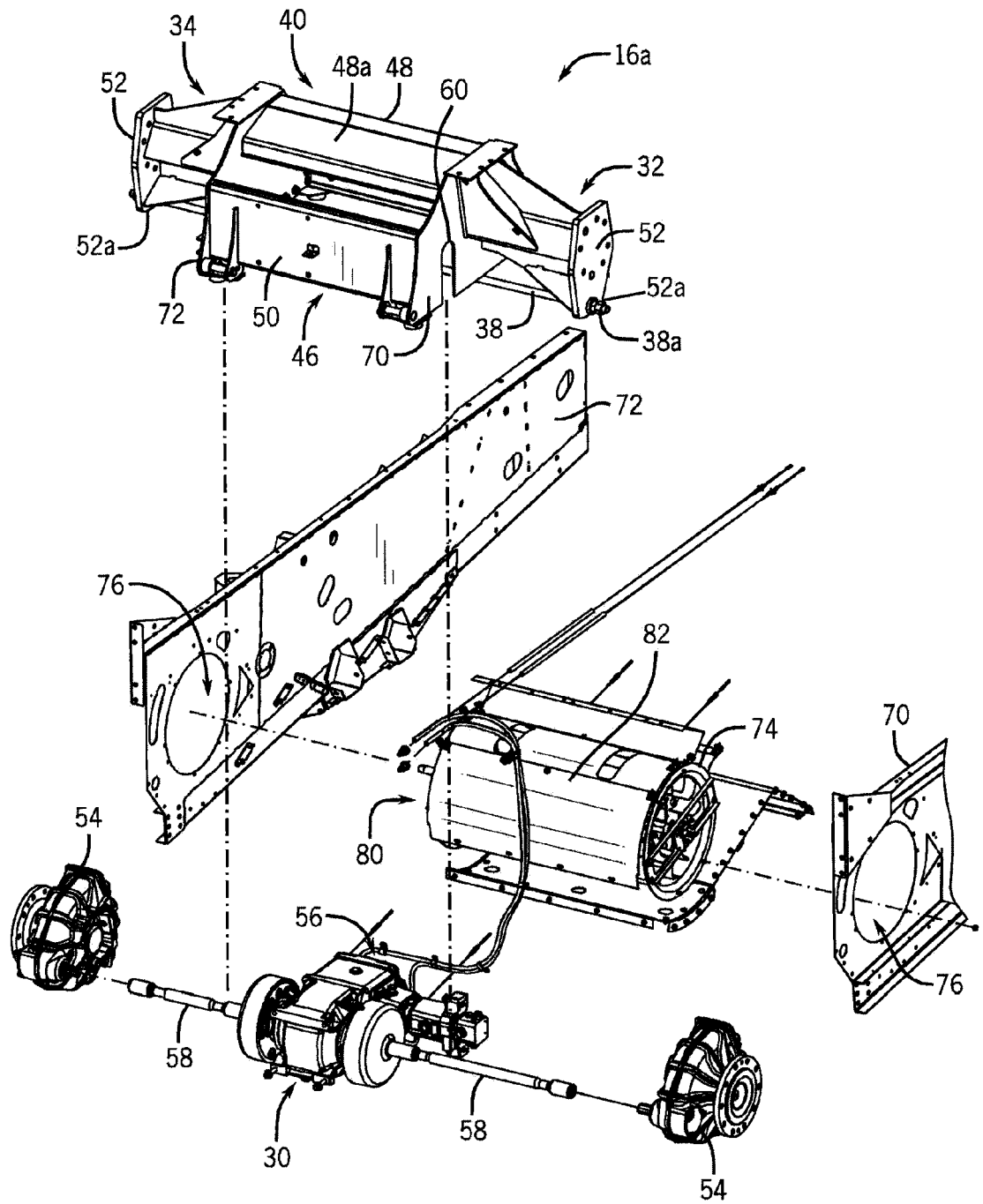
FIG. 4 is an exploded view of the support arrangement of FIG. 2.
Figure 5:
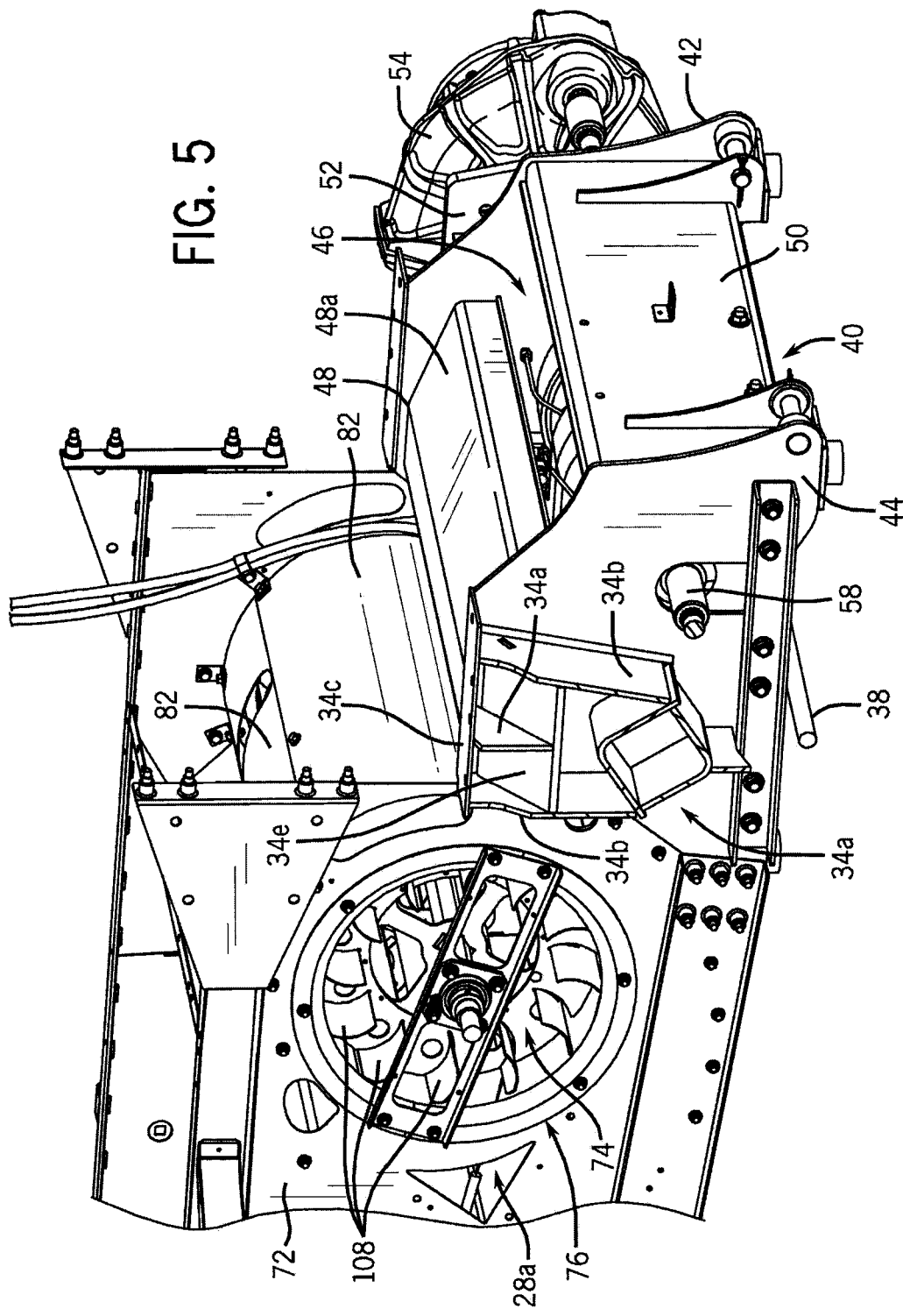
FIG. 5 is yet another partial perspective view of the support arrangement of FIG. 2, showing a cross-section taken along plane 5-5 of FIG. 2.

The stub axles 32 and 34 may also be configured in various ways. Referring in particular to FIG. 5, the depicted stub axle 34 (like the stub axle 32) is formed from a tube-shaped weldment 34a, which may be welded (or otherwise attached) to the side plate 44. As can be seen in FIGS. 2 and 3, in the depicted embodiment, the drive plates 52 may be attached (e.g., welded) to the weldment 34a. Welded flange plates 34b, an upper flange 34c, one or more ribs 34d, and various other structures (e.g., one or more plates 34e) may also be included, in order to reinforce the weldment 34a and the stub axle 34 in general. It will be understood, however, that other configurations are possible. For example, an alternative (or additional) stub axle (or portion thereof) may be formed as a hollow tube, box, or other weldment, each configured to provide appropriate structural rigidity and strength to support the weight of the vehicle at the wheels 12.

In the embodiment depicted, the stub axles 32 and 34 are disposed generally along a drive axis 12a (i.e., axis of rotation) of the wheels 12 (see, e.g., FIG. 2). In this regard, the stub axles 32 and 34 and the corresponding axle axis of the axle assembly 16a may be viewed as coaxially disposed with drive axis 12a of the wheels 12.

Each of the stub axles 32 and 34 includes a drive plate for attaching the relevant wheel 12 (directly or indirectly) to the stub axles 32 and 34. As shown in FIG. 3, for example, a drive plate 52 is attached at the laterally outer end of each stub axle 32 and 34. The drive plate 52 may be configured to support a final drive 54 (e.g., via various bolts, and so on), which may in turn support the relevant wheel 12. Each final drive 54 may include, for example, a gear box having a fixed portion that attaches to the relevant drive plate 52 and a rotatable portion that attaches to the relevant front wheel 12. In the embodiment depicted, ribs 32d and 34d (see, e.g., FIGS. 2 and 5) extend from the side plates 42 and 44, respectively, to provide lateral support to the drive plates 52.

A structural tie member (e.g., a tension rod 38) may attach to, and extend between, each of the drive plates 52 in order to provide further structural rigidity to the axle assembly 16a. In the embodiment depicted, for example, the drive plates 52 are configured to extend downward from the stub axles 32 and 34, such that the lower ends 52a of the drive plates 52 are generally below the lower edges of the side plates 42 and 44 of the axle support structure 40. The tension rod 38 is attached (e.g., secured by threaded connections 38a) at a location near the lower ends of the drive plates 52, such that the tension rod 38 is disposed generally below the axle support structure 40. It will be understood, however, that other configurations are possible. For example, the tension rod 38 (or another tie member) may be configured to extend through the side plates 42 and 44, or other members of the axle assembly 16a.

As noted above, the transmission assembly 30 for the front wheels 12 may be mounted such that the transmission assembly 30 is disposed (at least in part) within internal volume 46 of the axle support structure 40. In this way, the axle support structure 40 may both support the transmission assembly 30 with respect to the agricultural vehicle 10, and at least partially enclose the transmission assembly 30. This may serve to protect the transmission assembly 30 (at least in part) from impacts or other adverse events, while also efficiently utilizing the limited internal space of the vehicle 10.

In the embodiment depicted, the transmission assembly 30 is configured to attach to the front plate 50 of the axle support structure 40 (Le., such that the front plate 50 may be viewed as a mounting plate for the transmission assembly 30). Accordingly, the front plate 50 is configured to support the transmission assembly 30, and the internal volume 46 is configured to receive the transmission assembly 30, such that the transmission assembly 30 is disposed (at least in part) within the internal volume 46. In this regard, the internal volume 46 may be viewed as a "mounting volume" of the axle support structure 40 (and of the axle assembly 16, generally). Various attachment devices or arrangements may be utilized to attach the transmission assembly 30 to the front plate 50, including various bolts, brackets, hooks, pins, and so on. Where bolts or other removable attachment devices are utilized, the transmission assembly 30 may be relatively easily removed from the axle support structure 40 for maintenance.

As depicted, the front plate 50 and the internal volume 46 are configured such that the entire transmission assembly 30 is disposed within the volume 46 when the transmission assembly 30 is attached to the front plate 50 for operation. In other embodiments, a relevant mounting plate and mounting volume may be otherwise configured, such that only a portion of the transmission assembly 30 is disposed within the mounting volume. In certain embodiments, the transmission assembly 30 may be configured to attach to various plates (or other members) of the axle assembly 16*a* as an alternative to (or in addition to) the front plate 50.

In certain embodiments, additional components or devices may also be included (at least in part) within the relevant mounting volume for the vehicle transmission (e.g., within the internal volume 46 of the axle support structure 40). As depicted, for example, a hydraulic (or other) motor 56 for providing rotational power to the transmission assembly 30 is also disposed within the internal volume 46. The motor 56 may be supported with respect to the vehicle 10 by the front plate 50 (e.g., via attachment of the motor 56 to the transmission assembly 30) or by other features of the axle assembly 16*a*.

In order to convey rotational power from the transmission assembly 30 to the wheels 12, drive shafts may be configured to extend laterally from the transmission assembly 30 to the final drives 54. As depicted, for example, a shaft opening 76 is provided in each of the side plates 42 and 44. A drive shaft 58 may extend through each opening 76, respectively, such that rotational power may be transmitted from the transmission assembly 30, via the final drives 54, to the wheels 12.

Figure 6:
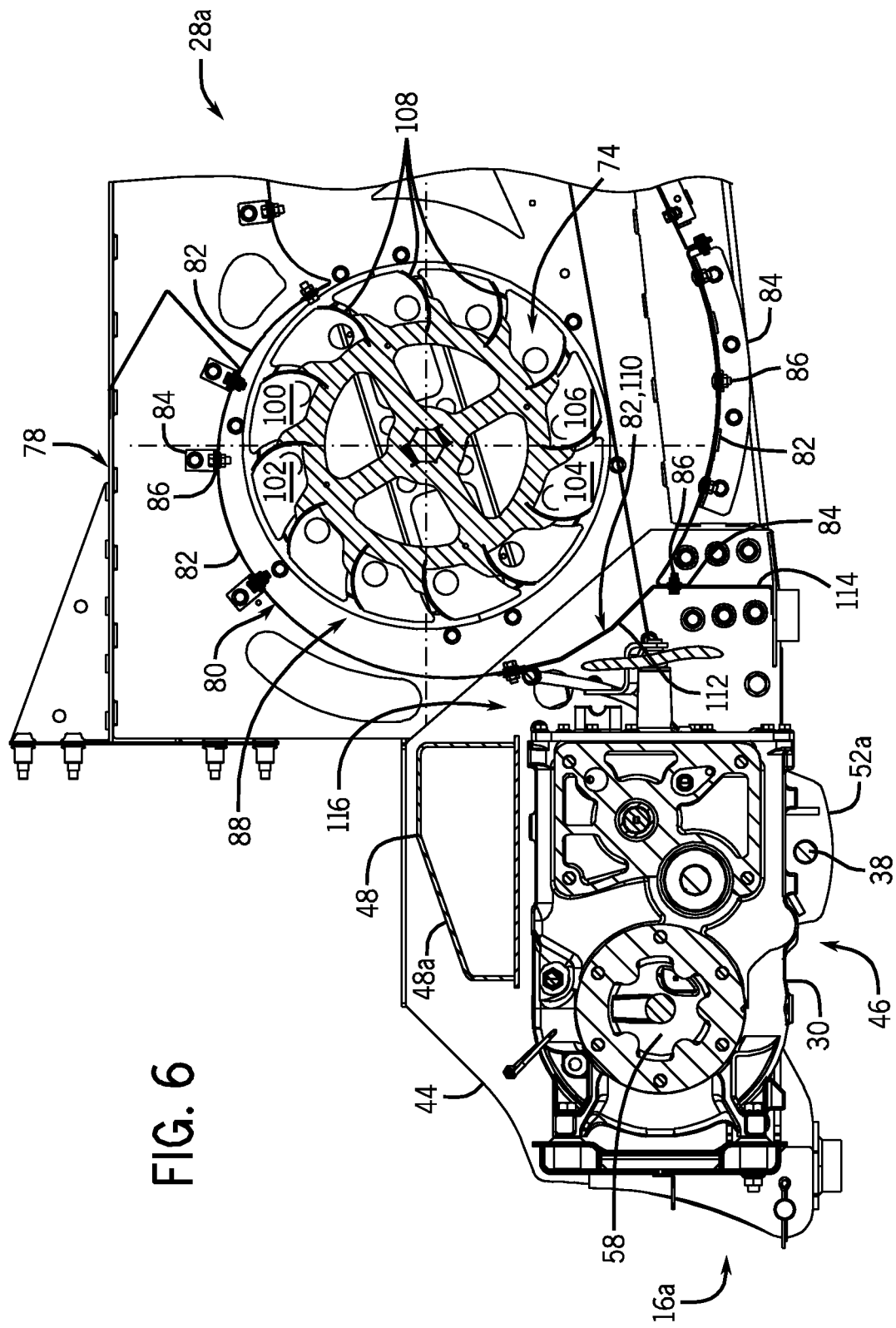
FIG. 6 is a side cross-sectional view of the support arrangement of FIG. 2, taken along plane 6-6 of FIG. 2.
Figure 7:
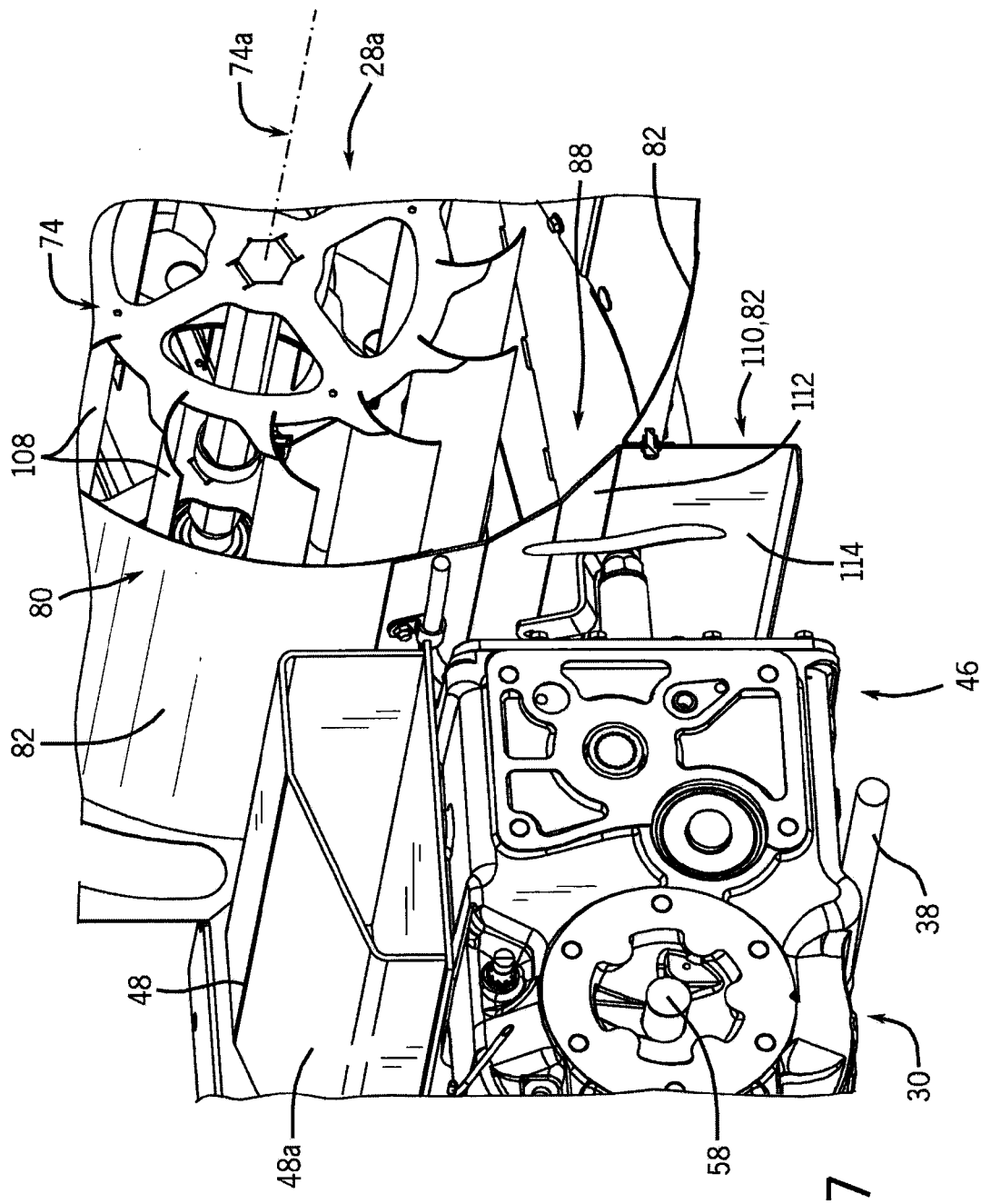
FIG. 7 is still another partial perspective view of the support arrangement of FIG. 2, showing a cross-section similar to FIG. 6.

As also noted above, it may be useful to configure a fan of a cleaning shoe (or similar other fan) to share at least one structural member with an axle assembly. Referring also to FIGS. 6 and 7, for example, a cleaning shoe 26*a* may include side sheets 70 and 72 extending longitudinally along the sides of the cleaning shoe 26*a*. The fan 28*a* may be disposed, at least in part, between the side sheets 70 and 72. When, as depicted, the fan 28*a* includes a laterally extending impeller 74, each side sheet 70 and 72 may accordingly include a circular opening 76 passing laterally through the side sheets 70 and 72. In the embodiment depicted, the circular openings 76 of the side sheets 70 and 72 are disposed coaxially with one another.

To protect the impeller 74 and other components, and to appropriately route air flow, the fan 28*a* includes a fan housing 78. As depicted, the fan housing 78 is formed in part by the side sheets 70 and 72 of the cleaning shoe 26*a*. It will be understood however, that other configurations are possible.

As depicted, the fan housing 78 also includes a scroll 80 to route air from the impeller 74 of the fan to the rearward portion of the cleaning shoe 26*a*. Generally, the scroll 80 may be formed in a logarithmic or other spiral, although other configurations are also possible. For convenience of reference herein, the scroll 80 (and the impeller 74) may be divided into four quadrants, an upper rearward quadrant 100, an upper forward quadrant 102, a lower forward quadrant 104, and a lower rearward quadrant 106. As depicted, the scroll 80 generally begins in the upper rearward quadrant 100, then traces a profile that extends radially outward and clockwise (e.g., from the perspective of FIG. 5) through the upper forward quadrant 102, the lower forward quadrant 104, and part of the lower rearward quadrant 106. It will be understood, however, that other configurations may be possible, depending on the characteristics of the fan 28*a* and the desired air flow.

As depicted, the scroll 80 is formed of a plurality of scroll plates 82, which may extend laterally between the side sheets 70 and 72 and may attach to the side sheets 70 and 72 with a plurality of brackets 84 and fasteners 86. The various scroll plates 82 may also attach to one another in various ways, in order to provide a continuous (or nearly continuous) shell around an impeller 74 of the fan 28*a*. In this way, the scroll 80 (by way of the scroll plates 82) may generally define an air-flow gap 88 (see, e.g., FIGS. 6 and 7) between the scroll 80 and the impeller 74 of the cleaning fan 28*a*.

As shown in particular in FIGS. 6 and 7, the impeller 74 for the cleaning shoe 26*a* may include various blades 108 extending outward from an axis of rotation 74*a* extending along the centerline of the impeller 74 (see, e.g. FIG. 7). As the impeller 74 rotates about the axis of rotation 74*a*, the successive positions of the tips of the blades 108 (or other radially extended portions of the impeller 74) trace a generally circular outer boundary for the impeller 74. The air-flow gap 88 may be further defined, at least in part, by the path traced by this outer boundary.

In this light, as the impeller 74 rotates, air from the impeller 74 may be routed from the fan 28*a*, along a counter-clockwise path (from the perspective of FIG. 6) through the air-flow gap 88, to rearward portions of the cleaning shoe 26*a*. In this way, an appropriately configured scroll 80 may contribute to effective and efficient cleaning of crop material within the cleaning shoe 26*a*.

The width of the air-flow gap 88 in a radial direction, with a radial center coaxial with the cleaning fan 28*a*, may vary along the scroll 80. As depicted, for example, the gap 88 is smallest at the start of the scroll 80 (i.e., in the upper rearward quadrant 100) and widens relatively continuously to its widest point at the end of the scroll 80 (i.e., in the lower rearward quadrant 106). It will be understood, however, that other configurations may be possible.

In the embodiment depicted, each scroll plate 82 defines a generally flat contour (or series of flat contours) along the scroll 80, with the scroll plates 82 thereby collectively approximating a curved, spiral shape even though no individual scroll plate 82 may actually be curved. It will be understood, however, that other embodiments of the fan 28*a* and the fan housing 78 may alternatively (or additionally) include various curved plates to define the scroll 80. Likewise, the scroll 80 may be formed from a single sheet or plate, rather than the multiple scroll plates 82, whether the scroll 80 is curved, angled to approximate a curve, or otherwise contoured.

In order to utilize internal space of the vehicle 10 in an efficient manner, the cleaning shoe 26*a* and the front axle assembly 16*a* may share, and may connect to each other through, one or more shared structural members (or other support structures). In certain embodiments, the scroll of the fan 28*a* for the cleaning shoe 26*a* may share one or more structural members with the axle assembly 16*a*. In the embodiment depicted in the various figures, for example, one of the scroll plates 82 of the fan scroll 80 is also configured as a rearward support plate 110 for the support structure 40 of the axle assembly 16a. In this way, the plate 110 may provide structural support to the support structure 40 of the front axle assembly 16a, as well as to the fan housing 78, while simultaneously serving, at least in part, to define the contour of the scroll 80.

The shared members or structures of the scroll 80 and axle assembly 16a may be configured in a variety of ways. In certain embodiments, the shared support member may be include one or more portions that do not serve to define the contours of the scroll 80. As depicted, for example, the support plate 110 includes a scroll section 112, which may serve to define a portion of the scroll 80 (and, thereby, the air-flow gap 88). Also as depicted, the support plate 110 further includes a support section 114, which extends generally downward from the scroll section 112 (and away from the air-flow gap 88) to provide additional structural support to the axle assembly 16a.

As depicted, the scroll section 112 of the support plate 110 includes two flat portions connected at an angle, in order to approximate the desired curve of the scroll 80. In other embodiments, the scroll section 112 may instead be curved, or otherwise contoured. Similarly, the scroll section 112 and the support section 114 of the plate 110 are depicted as formed from a single metal sheet. It will be understood, however, that other configurations are possible. For example, the structure provided by plate 110 may, in certain embodiments, be instead provided by two or more separate plates (or other members). Such separate plates may be fastened together (e.g., by welding or bolts) for attachment to the axle assembly 16a and fan 28a, or may be attached to the axle assembly 16a and fan 28a separately.

In certain embodiments, the various members of the axle support structure 40 may define one or more passages from the exterior of the axle support structure 40 (and the axle assembly 16a, generally) into the internal volume 46. In the embodiment depicted, for example, a passage 116 is defined by the upper support structure 48 and the scroll 80 (including the support plate 110). As can be seen in particular in FIG. 6, the passage 116 extends upward and rearward from the internal volume 46 to the exterior of the axle support structure 40. Such a passage may be useful, for example, to reduce the build-up of debris (e.g., dirt and stones) within the volume 46. Further, such a passage may provide a useful routing path for hydraulic, electronic, or other conduits or cables (e.g., a hydraulic line to power one or more hydraulic motors included in the transmission assembly 30).

In certain embodiments, various spatial relationships between components of the fan 28a and the axle assembly 16a may be implemented. Still referring in particular to FIG. 6, for example, the side sheets 70 and 72 and the side plates 42 and 44 are configured to overlap longitudinally, in order to provide additional structural strength to the relevant assemblies. Also as depicted, the impeller 74 of the fan 28a is disposed generally above and laterally between (as viewed from above) the side plates 42 and 44.

Other configurations may also be possible. In certain embodiments, for example, the impeller 74 may be physically between the side plates 42 and 44 (i.e., such a portion of the impeller 74 longitudinally overlaps with the side plates 42 and 44). Similarly, the shared support plate 110 may be configured without the support section 114 (e.g., configured to include only the scroll portion 90) or may include a different support section (e.g., a support section extending forward towards the transmission assembly 30 or rearward toward the cleaning shoe 26a.

In certain embodiments of the vehicle 10 with an integrated transmission and axle arrangement, a fan scroll (or other portion of a fan housing) may not include a shared support member with an axle assembly. For example, in certain embodiments, a transmission assembly for the front wheels of the vehicle 10 may be disposed within an internal volume of an axle assembly (e.g., an assembly similar to axle assembly 16a), but a rear support plate of the axle assembly (e.g., a plate similar to the support plate 110) may not also form a portion of a fan scroll.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, components, operations, or arrangements, but do not preclude the presence or addition of one or more other features, components, operations or arrangements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. In an agricultural vehicle (10) having ground-engaging wheels (12) or tracks supporting a chassis (10a), an axle arrangement coupling the ground-engaging wheels or tracks to the chassis, the axle arrangement comprising:
   a support structure (40) defining an internal mounting volume (46) configured for mounting a transmission assembly (30) therein;
   first and second stub axles (32, 34) extending from opposite sides of the support structure along an axle axis (12a), wherein the mounting volume is disposed along the axle axis;
   drive plates (52) at free ends of the stub axles; and
   final drive assemblies (54) mounted to the drive plates for driving rotation of the ground-engaging wheels or tracks;
   wherein the support structure includes a support plate (110) that defines a scroll plate (82) for a scroll (80) of a fan housing (78) for a cleaning shoe (26a), the support plate having a scroll section (112) defining a portion of the scroll and a support section (114) that provides additional structural support to the axle arrangement; and
   wherein the scroll section is defined as multiple flat portions at an angle to one another to approximate a curved portion of the scroll.

2. The axle arrangement of claim 1, wherein the support structure includes longitudinal support members (42, 44) that are spaced apart along, and intersect, the axle axis and includes lateral support members (48, 50) spanning the longitudinal support members.

3. The axle arrangement of claim 2, wherein the lateral and longitudinal support members are separate members, and wherein each lateral support member connects to the longitudinal support members.

4. The axle arrangement of claim 3, wherein the lateral support members are metal plates and the longitudinal support members are angled structural members (48).

5. The axle arrangement of claim 1, wherein each of the stub axles includes at least one metal plate (32a, 34a) extending between the support structure and a plate (52) configured to attach one of the ground-engaging wheels or tracks to the stub axle.

6. The axle arrangement of claim 5, wherein each stub axle is a weldment (32a, 34a) of multiple metal plates fixed with respect to the support structure.

7. The axle arrangement of claim 1, further including a structural tie member (38) extending between the drive plates.

8. The axle arrangement of claim 1, wherein the axle axis is coaxial with a drive axis (12a) of the ground-engaging wheels or tracks.

9. The axle arrangement of claim 1, wherein the support plate is a single plate forming the scroll section and the support section.

10. In an agricultural vehicle (10) having ground-engaging wheels (12) or tracks supporting a chassis (10a), an axle arrangement coupling the ground-engaging wheels or tracks to the chassis, the axle arrangement comprising:
a support structure (40) having spaced apart mounting plates (42, 44) and at least one structural cross-member (48) connecting the mounting plates, the support structure defining an internal mounting volume (46) configured for mounting a transmission assembly (30) therein;
first and second stub axles (32, 34) extending from the mounting plates along an axle axis (12a), wherein the mounting volume is disposed along the axle axis;
drive plates (52) at free ends of the stub axles; and
final drive assemblies (54) mounted to the drive plates for driving rotation of the ground-engaging wheels or tracks;
wherein the support structure includes a support plate (110) that defines a scroll plate (82) for a scroll (80) of a fan housing (78) for a cleaning shoe (26a), the support plate having a scroll section (112) defining a portion of the scroll and a support section (114) that provides additional structural support to the axle arrangement; and
wherein the scroll section is defined as multiple flat portions at an angle to one another to approximate a curved portion of the scroll.

11. The axle arrangement of claim 10, further including drive plates (52) at free ends of the stub axles.

12. The axle arrangement of claim 11, further including a structural tie member (38) extending between the drive plates.

13. The axle arrangement of claim 10, wherein the axle axis is coaxial with a drive axis (12a) of the ground-engaging wheels or tracks.

14. The axle arrangement of claim 10, wherein the support plate is a single plate forming the scroll section and the support section.

15. An agricultural vehicle (10), comprising:
a chassis (10a);
a set of ground-engaging wheels (12) or tracks for supporting the chassis with respect to ground;
an axle assembly (16a) aligned with an axle axis (12a) and including:
a support structure (40) having spaced apart mounting plates (42, 44) and at least one structural cross-member (48) connecting the mounting plates, the support structure defining an internal mounting volume (46) configured to mount a transmission assembly (30) therein;
first and second stub axles (32, 34) fixed to, and extending from, the mounting plates along the axle axis;
drive plates (52) at free ends of the stub axles;
final drive assemblies (54) mounted to the drive plates for driving rotation of the ground-engaging wheels or tracks; and
a cleaning shoe (26a) having a fan (28a), the fan having a fan housing (78) with a scroll (80) including at least one scroll plate (82) configured as a support plate (110), the support plate having a scroll section (112) defining a portion of the scroll and a support section (114) that provides additional structural support to the axle assembly;
wherein the scroll section is defined as multiple flat portions at an angle to one another to approximate a curved portion of the scroll.

16. The agricultural vehicle of claim 15, further including a structural tie member (38) extending between the drive plates.

17. The agricultural vehicle of claim 15, wherein the transmission assembly includes at least one drive shaft (58) coupled to the final drive assemblies, and wherein the transmission assembly is mounted within the mounting volume of the support structure such that the at least one drive shaft extends through openings (60) in the mounting plates.

18. The agricultural vehicle of claim 17, further including a drive motor (56) disposed within the mounting volume and coupled to the transmission assembly to drive rotation of the at least one drive shaft.

19. The agricultural vehicle of claim 15, wherein the axle axis is coaxial with a drive axis (12a) of at least one of the final drive assemblies.

20. The agricultural vehicle of claim 15, wherein the support plate is a single plate forming the scroll section and the support section.

* * * * *